Feb. 11, 1958   G. J. HORVITZ   2,822,609
BRAZING PROCESS
Filed Nov. 10, 1955
FIG. 1.
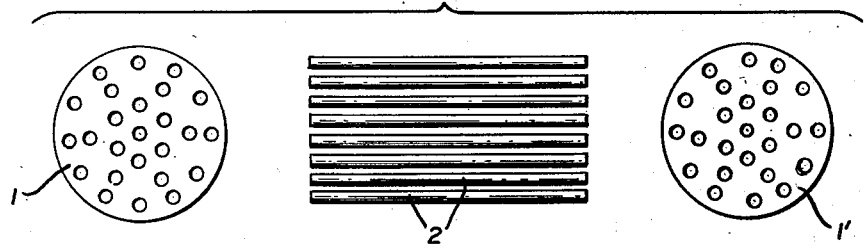
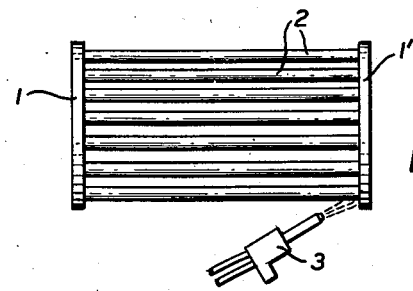
FIG. 2.
FIG. 3.
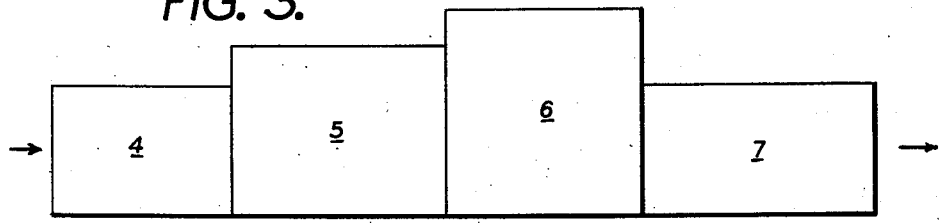
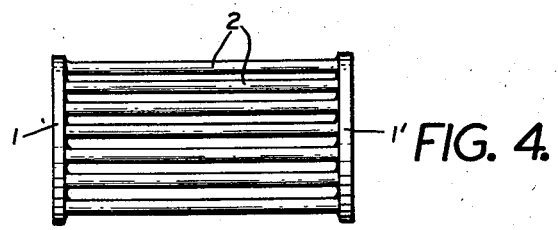
FIG. 4.

Figure 5A:
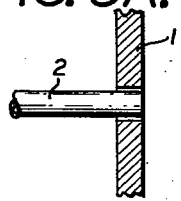

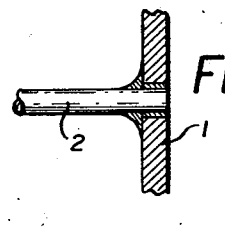
FIG. 5B.
GERALD J. HORVITZ  INVENTOR
BY Mock & Blum
ATTORNEYS

United States Patent Office 2,822,609
Patented Feb. 11, 1958

2,822,609
BRAZING PROCESS

Gerald J. Horvitz, Woodmere, N. Y., assignor to Niphos Corporation, New York, N. Y., a corporation of New York Application November 10, 1955, Serial No. 546,089

10 Claims. (Cl. 29—494)

This invention relates to a new and improved method of connecting articles and surfaces by brazing and it has particular relation to a method in which the metallic material for uniting the articles and/or surfaces to be connected is formed in situ during the brazing step.

The invention is based on the concept of providing the surfaces to be connected with a coating which consists of ingredients capable of being reduced to metals and subjecting the coated surfaces to a reducing treatment, whereby an alloy of metals, into which said ingredients are converted, is formed and acts as a brazing material for the surfaces to be connected.

The bodies which can be brazed in this manner, may be for example tubes, plates, castings, forgings and others.

By the application of the present invention assemblies of complicated shapes can be conveniently obtained by brazing also in cases, in which the formation of the respective assembly according to known methods for example by gas welding or electric arc welding, would be difficult. Furthermore a multitude of assemblies can be made in a single operation, whereby labor, time and expenses can be saved.

According to the process of my invention metallic articles or bodies of different composition can also be joined with each other, which are difficult to weld or braze according to the methods known to the art.

Another advantage of the present invention consists in that, as a rule, corrosion-resistant bonds are obtained.

As examples of metals which can be united by brazing according to my invention, cast iron, cast steels, titanium alloys, molybdenum and stainless steels are mentioned.

In carrying out my invention braze metals are produced by reduction from a metallic oxide or oxides to a metallic alloy which is in turn alloyed to the base metal at the interface of the articles or bodies to be joined or connected. Instead of oxides of metals, metal salts can also be used and the salts are reduced to the metallic condition in carrying out the invention.

It is important that the surfaces to be joined should be absolutely clean, i. e., absolutely free from rust, grease, dirt, scale, paint, or the like.

The base metals to be joined may be rigid or bendable. The braze formed according to my invention is ductile so that it can withstand bending.

According to my invention, I apply to the surfaces of the articles or bodies to be joined, a mixture comprising (a) a metallic oxide, or a mixture of metallic oxides, or a metal salt or salts, and (b) a salt or salts, such as ammonium salts, containing certain selected elements of the fifth group of the periodical system i. e., phosphorus, arsenic, antimony and bismuth. The melting points of these elements are relatively low, i. e. 44.1°, 814°, 630°, and 268° C., respectively. However the major ingredient of the brazing material used in carrying out my invention is a metal which has a higher melting point than the before-mentioned elements of the fifth group. Such major ingredient may be nickel which has a melting point of 1450° C.; cobalt which has a melting point of 1467° C.; copper which has a melting point of 1083° C.; or iron which has a melting point of 1540° C.; tungsten which has a melting point of 3410° C. But the invention is not limited to the use of the above mentioned high melting metals which are stated only for purpose of illustration.

As a preferred example of the invention and without limiting the same to the ingredients or proportions or other details specified therein, the following is stated:

A mixture is made of nickel monoxide (NiO) and of ammonium dihydrogen orthophosphate in the ratio of 2½ to 1 or 4 to 1, or 8 to 1. Instead of the before-mentioned phosphate, diammonium monohydrogen orthophosphate or triammonium orthophosphate can also be used. Furthermore, nickel oxide having the formula $Ni_2O_3$, or nickel carbonate of the formula $NiCO_3$ can be used. The above proportions may be varied in accordance with the specific substances which are used to make the mixture.

The specific proportions above given relate particularly to mixtures of NiO and of $(NH_4)H_2PO_4$. Minor proportions of other ingredients may be present in the above mentioned mixture without departing from the invention.

The above described mixture of nickel oxide and ammonium phosphate is mixed with sufficient water or other liquid in order to produce a paint-like consistency so that the mixture can be applied to the surfaces to be joined e. g., by brushing, dipping or spraying to form a fillet or coating which may have a thickness of for example 0.05 cm. or heavier. The amount of water which must be added to the mixture in order to produce a coherent and adherent fillet or coating will vary with the proportion of the ingredients present in the mixture. In using NiO and $(NH_4)H_2PO_4$ in the ratio of 2½ to 1, I have found it sufficient to intermix 5 parts of said mixture with 1 to 2 parts of water. The mixture of the ingredients with each other and with the water can be made in an ordinary machine which is used for mixing and grinding paints. The above mentioned ammonium phosphates are freely soluble in water and all or substantially all of the ammonium phosphate is dissolved in the water or other vehicle which is used in making the mixture.

The surfaces to be coated and subsequently to be joined can be coated with the fluid aqueous mixture in any suitable manner such as spraying, brushing or the like. The particle size of the water-insoluble ingredients of said mixture may be about 1 to 5 microns.

The articles or surfaces to be joined are then placed in the proper position and the moist coating applied to the surfaces to be joined. The assembly is then heated in a suitable reducing atmosphere. This atmosphere may consist of pure hydrogen or of other suitable gas or vapor which can reduce the ingredients of the coating, e. g., nickel oxide or other oxide to the respective metal. The reducing temperature may be in the range of 1600° F., to 2000° F., and is below the melting point of the metallic nickel or other high melting metals present in the mixture. The coating may be dried at room temperature, e. g. 70° F., before it is heated in the reducing atmosphere, but it can be heated and reduced before it has lost any substantial part of its liquid content. The action of reducing agent at high temperature decomposes the phosphase and alloys of nickel with phosphorus are formed.

It is preferred to use as the reducing gas hydrogen or dissociated ammonia which is passed over the surfaces to be joined preferably at the rate of about 4 cubic feet per hour for each square foot of the surface.

In proceeding in the above described manner, an alloy of nickel and phosphorus is formed which unites the surfaces to be connected by interalloying with the base materials. Capillary attraction also causes the reduced braze medium to be carried into the interstices or spaces between the adjoining elements of the base metals.

Cobalt oxide when used without the addition of any other metal oxide for carrying out the present invention, is not reduced satisfactorily in mixture with $$(NH_4)H_2PO_4$$

under the temperature conditions stated above. However, when cobalt oxide is used to replace part of the nickel oxide, satisfactory reduction is obtained. This cobalt oxide may be formula CoO, although I can use any of the various nickel oxides or cobalt oxides which can be reduced to the metallic state under the conditions specified herein. These oxides may be used also in mixtures. The percentage of cobalt oxide in the preferred example is preferably, but not necessarily, less than the percentage of nickel oxide. In the preferred example, the percentage of cobalt oxide may be about 3% of the percentage of nickel oxide.

Other ingredients, such as copper oxide and iron oxide, can be used in combination with nickel oxide together with the phosphate salts to produce a Monel-type or stainless steel type alloy which is adapted to connect the surfaces to be united according to the method of my invention.

For example, a mixture of 25% copper oxide (CuO), 20% of NiO, 20% of $Fe_2O_3$ and the balance an ammonium phosphate can be used to produce a welding bond between the surfaces to be united.

Some examples of mixtures which can be used in carrying out my invention and the temperatures at which these mixtures can be reduced to form the metallic bonds between the surfaces to be connected, are as follows:

| Mixtures | Temperature Range for Reduction, Degrees C. |
| --- | --- |
| $NiO+(NH_4)_2HPO_4$ | 880–1,205 |
| $NiO+CoO+(NH_4)_2HPO_4$ | 880–1,205 |
| $NiO+CuO+(NH_4)_2HPO_4$ | 705–1,000 |
| $WO_3+NiO+CoO+(NH_4)_2HPO_4$ | 815–1,100 |
| $NiO+Fe_2O_3+(NH_4)_2HPO_4$ | 875–1,095 |
| $CuO+(NH_4)_2HPO_4$ | 540–1,000 |

These temperature ranges are far below the melting points of the high melting constituent or constituents present in the mixtures.

It is only necessary to keep the joint to be formed under the reducing atmosphere in the furnace long enough for forming the metals and their alloy, of which the desired bond consists. The invention is not limited to any particular method of reduction. The reduction can take place at ordinary atmospheric pressure or above or below ordinary atmospheric pressure.

In addition to using various ammonium phosphates, I can use salts or oxides of the other selected fifth group elements, such as bismuth dioxide ($Bi_2O_2$), bismuth trioxide ($Bi_2O_3$) and other oxides of bismuth. I can also use ammonium arsenates, such as ortho-ammonium dihydrogen arsenate $(NH_4)H_2AsO_4$, or orthoammonium mono-hydrogen arsenate $(NH_4)_2HAsO_4$.

The invention generally includes the use of various oxides or salts or other compounds of the selected elements of the fifth group which are reduced or decomposed under the working conditions of my invention to yield the selected metal to form an alloy with the high melting metal selected in the respective case, said alloy forming the bond between the surfaces to be united according to my invention.

In carrying out my invention, the alloy bond is preferably fused or it is at least sintered in order to form a coherent and impervious layer which alloys with the metal of the base bodies. In the preferred example, the percentage of phosphorus in the phosphor-nickel bond, in the early stages of reduction is at least 8–10%, so that the melting point of the initially formed alloy bond is approximately 1600° F. to 1838° F., or 880° C. to 1000° C. As reduction proceeds, the phosphorus content may be reduced to about 2% and the phosphor-nickel alloy has a melting point of 2400° F., or 1300° C. Such increase of the melting point of the alloy bond has the advantage of allowing to carry out rebrazing without affecting the original braze.

The bond thus formed is resistant to atmospheric corrosion and it also offers satisfactory resistance to a hot solution of 5% sulfuric acid at a temperature of 180° F., and to a 5% aqueous hydrochloric acid at ordinary room temperature of about 70° F.

Instead of using oxides or other compounds of nickel or cobalt, I can use the oxides or compounds of various other corrosion resistant metals, whose melting points are higher than the melting points of the selected fifth group elements. For example, I can utilize a compound of chromium, e. g. $Cr_2O_3$, of which the metallic element has a melting point of 1520° C., or a compound of molybdenum e. g. $MoO_2$ or $MoO_3$, of which the metallic element has a melting point of approximately 2620° C., or a combination of these compounds.

Of course, the working temperature during the reduction may be varied, depending upon the ingredients of the oxide, etc., mixture used and the melting or bonding point of the alloy to be formed as the bond between the surfaces to be connected. This working temperature is preferably, but not necessarily, less than the melting point of the base materials to be connected by the process of my invention. The working temperature should be high enough to fuse, or at least to sinter, the bond to be formed and to be interalloyed with the material of the articles or the like, to be connected. The melting of the bond at relatively low temperature is secured by the formation of an alloy from the high melting metal or metals with minor percentages of metals, which have relatively low melting points, such as for example, phosphorus, arsenic, antimony and bismuth.

*Example 1*

Two tubes consisting of stainless steel, having an outer diameter of 2" and a wall thickness of .188" are coated by brushing at their surfaces to be connected with a mixture consisting of the following ingredients:

$$\underset{(70\%)}{NiO} + \underset{(15\%)}{(NH_4)_2HPO_4} + \underset{(15\%)}{H_2O}$$

The coated tubes are then held with their ends to be connected being in contact with each other and are introduced in this position into a furnace, in which they are heated in a hydrogen atmosphere to 1000° C., for 15 minutes. During this time, reduction of the mixture and formation of an alloy bond which connects the ends of the tubes and interalloys with the metal of the tubes, is formed.

In carrying out this example, instead of the mixture described above, any of the following mixtures can be used:

a. $NiO(40\%) + CuO(30\%) + (NH_4)_2HPO_4(15\%) + H_2O(15\%)$ b. $NiO(60\%) + WO_3(10\%) + (NH_4)_2HPO_4(15\%) + H_2O(15\%)$ c. $NiO(60\%) + CoO(10\%) + (NH_4)_2HPO_4(15\%) + H_2O(15\%)$

The reduction of these mixtures can be effected e. g. by hydrogen, dissociated ammonia or cracked manufactured gas. The reduction temperatures are: 900° C., in the case of mixture (a), 1100° C., in the mixture (b) and 1000° C., in the mixture (c). Tubes consisting of other metals, e. g. wrought iron, cast iron, cast steel and malleable iron, can be likewise brazed in the above described manner.

Example 2

Sheets and pins consisting of low carbon steel, of a thickness of .175" and .125" respectively are coated by spraying their surfaces to be connected with a mixture consisting of the following ingredients:

$$NiO + (NH_4)_2HPO_4 + H_2O$$
$$(65\%) \quad (20\%) \quad (15\%)$$

The coated sheets and pins are held with their surfaces to be connected being in contact with each other and are introduced in this position into a furnace, in which they are heated in a hydrogen atmosphere to 1000° C., for 15 minutes. During this time, reduction of the mixture and formation of an alloy bond which connects the ends of the sheets and pins and interalloys with the metal of the sheets and pins take place.

In carrying out this example, any of the following mixtures can be used:

a. $NiO(50\%) + WO_3(10\%) + CoO(10\%) + (NH_4)_2HPO_4(15\%) + H_2O(15\%)$
b. $CuO(70\%) + (NH_4)_2HPO_4(15\%) + H_2O(15\%)$
c. $NiO(60\%) + Fe_2O_3(10\%) + (NH_4)_2HPO_4(15\%) + H_2O(15\%)$

The reduction of these mixtures can be effected by hydrogen or dissociated ammonia. The reduction temperatures are: 1095° C. in the case of mixture (a), 850° C., in the case of mixture (b), and 1050° C., in the case of mixture (c).

Example 3

A safety valve consisting of cast steel or cast iron having an insert ring for a valve seat is brazed by coating the surfaces to be joined with a mixture consisting of the following ingredients:

$$NiO(30\%) + CoO(30\%) + (NH_4)_2HPO_4(30\%) + H_2O(10\%)$$

The coated casting and seat are then held with their ends to be connected being in contact with each other and are introduced in this position into a furnace, in which they are heated in a hydrogen atmosphere to 1050° C., for 1 hour.

In carrying out this example, instead of the mixture described above any of the following mixtures can be used:

a. $NiO(45\%) + (NH_4)_2HPO_4(45\%) + H_2O(10\%)$
b. $NiO(40\%) + Cr_2O_3(20\%) + (NH_4)_2HPO_4(25\%) + H_2O(15\%)$
c. $NiO(40\%) + Cr_2O_3(10\%) + CoO(10\%) + (NH_4)_2HPO_4(25\%) + H_2O(15\%)$

The reduction of these mixtures can be effected by hydrogen or dissociated ammonia. The reduction temperatures are 940° C., in the case of mixture (a), 1100° C., in the case of mixture (b), and 1050° C., in the case of mixture (c).

In carrying out my invention, strong, adherent, impervious, ductile and bendable brazing bonds are obtained and the invention can be used to join small parts that may be damaged by other welding or brazing methods. My process can also be used for brazing materials, e. g., cast iron, titanium and some stainless steels, where other methods are not effective and it can be used with advantage for forming joints in pipe networks, particularly if corrosive conditions are encountered. My invention imparts a braze to stainless steel, which will not cause precipitation of carbides in the deposited metal or heat affected zone.

It will be understood from the above that this invention is not limited to specific materials, steps, conditions and other details specifically described above and can be carried out with various modifications. For example, instead of the mixtures described above, the following mixtures can be used for producing the bonds in my brazing process:

| Materials | Proportions |
|---|---|
| $NiO + CoO + (NH_4)H_2PO_4$ | 37:3:20. |
| $NiO + Bi_2O_3 + Water$ | 18:2:3. |
| $NiO + Bi_2O_3 + 28\%$ aqueous $NH_4OH$ | 18:2:3. |
| $CuO + Sb_2O_3$ | 10:1. |
| $Cr_2O_3$ wetted with a mixture of equal parts of 1:1 aqueous HCl and aqueous $H_3PO_4$: | |
| $NiO + CoO + (NH_4)H_2PO_4$ | 8:2:2.5. |
| $NiO + Cr_2O_3 + (NH_4)H_2PO_4$ | 4:1:1 or 8:1:1. |

As examples of liquids which can be used instead of water in carrying out my invention, carbon tetrachloride, methyl alcohol, and ethyl alcohol are mentioned. A wetting agent, e. g., sodium sulfosuccinate, can be present in the mixture used in my process. These and other modifications can be made without departing from the scope of the invention as defined in the appended claims.

The parts mentioned above are by weight, if not otherwise stated.

The appended drawings diagrammatically illustrate an example of the method of my invention, to which the invention is not limited.

Fig. 1 shows the tubes and end plates of a heat exchanger in unassembled condition; Fig. 2 illustrates these parts in assembled condition prior to brazing and the application of the brazing mixture to the surfaces to be connected; Fig. 3 indicates a unit of several chambers, through which the parts to be brazed are passed; Fig. 4 illustrates the completed brazed assembly and Figs. 5A., 5B, and 5C, a tube and a part of the end plate in various phases of my method, on an enlarged scale.

In the drawings the reference symbols 1, 1' denote the end plates of a heat exchanger, while the tubes are denoted 2, 2. Figure 1 shows these parts in unassembled condition, while in Fig. 2 they are assembled and the surfaces to be connected are provided by sprayer 3 with a coating of the brazing mixture.

The coated assembly is successively passed through a drying chamber 4, preheating chamber 5, firing chamber 6 and a cooling chamber 7, the temperatures and atmospheres of which are controlled in the manner described above, for example as follows:

| | Atmosphere | Temperature, ° F. |
|---|---|---|
| Drying chamber | $N_2$ and $O_2$ | 160–200 |
| Preheating chamber | $N_2$ and $H_2$ | 500–1,400 |
| Firing chamber | $N_2$ and $H_2$ | 1,750 |
| Cooling chamber | $N_2$ and $H_2$ | 1,400–500 |

Passing of the articles through this system of chambers can be carried out discontinuously, or preferably continuously.

Figure 5C:
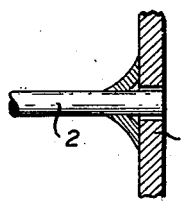

The brazed completed heat exchanger is shown in Fig. 4 and a tube and a part of the end plate in unbrazed, sprayed on and brazed condition, are shown in Fig. 5 on an enlarged scale.

The term "dissociated ammonia" is used herein to denote a mixture of nitrogen and hydrogen. The "cracked manufactured gas" can be prepared from many types of gas sources, e. g. city illuminating gas, watergas, coal gas, oil gas, natural gas, or mixtures of these gases. After cracking, drying and $CO_2$ removal, these gases consist mainly of CO, $N_2$ and $H_2$.

What is claimed is:

1. A method of brazing metallic parts and articles, comprising preparing a mixture of paint-like consistency (a) from an ammonium phosphate, (b) at least one oxide selected from the group consisting of oxides of nickel, cobalt, copper, molybdenum, tungsten and iron and (c) water; assembling the metallic parts to be brazed to form a joint; painting the edge portion of the joint with said mixture; heating the resulting assembly in a reducing atmosphere in order to cause said mixture to decompose and form a metallic alloy composed of the elements of said mixture and to cause said alloy to flow into the joint and bring about brazing of the metallic parts to be joined.

2. A method of brazing metallic parts and articles, comprising preparing a mixture of paint-like consistency (a) from ammonium phosphate, (b) nickel oxide and (c) water; assembling the metallic parts to be brazed to form a joint; painting the edge portion of the joint with said mixture; heating the resulting assembly in a reducing atmosphere in order to cause said mixture to decompose and form a metallic alloy composed of nickel and phosphorus and to cause said alloy to flow into the joint and bring about brazing of the metallic parts to be joined.

3. A method of brazing metallic parts and articles, comprising preparing a mixture of paint-like consistency (a) from ammonium phosphate, (b) cobalt oxide and (c) water; assembling the metallic parts to be brazed to form a joint; painting the edge portion of the joint with said mixture; heating the resulting assembly in a reducing atmosphere in order to cause said mixture to decompose and form a metallic alloy composed of cobalt and phosphorus and to cause said alloy to flow into the joint and bring about brazing of the metallic parts to be joined.

4. A method of brazing metallic parts and articles, comprising preparing a mixture of paint-like consistency (a) from ammonium phosphate, (b) nickel oxide and cobalt oxide and (c) water; assembling the metallic parts to be brazed to form a joint; painting the edge portion of the joint with said mixture; heating the resulting assembly in a reducing atmosphere in order to cause said mixture to decompose and form a metallic alloy composed of nickel, cobalt and phosphorus and to cause said alloy to flow into the joint and bring about brazing of the metallic parts to be joined.

5. A method of brazing metallic parts and articles, comprising preparing a mixture of paint-like consistency (a) from ammonium phosphate, (b) nickel oxide and copper oxide and (c) water; assembling the metallic parts to be brazed to form a joint; painting the edge portion of the joint with said mixture; heating the resulting assembly in a reducing atmosphere in order to cause said mixture to decompose and form a metallic alloy composed of nickel, copper and phosphorus and to cause said alloy to flow into the joint and bring about brazing of the metallic parts to be joined.

6. A method of brazing metallic parts and articles, comprising preparing a mixture of paint-like consistency (a) from ammonium phosphate, (b) nickel oxide and tungsten oxide and (c) water; assembling the metallic parts to be brazed to form a joint; painting the edge portion of the joint with said mixture; heating the resulting assembly in a reducing atmosphere in order to cause said mixture to decompose and form a metallic alloy composed of nickel, tungsten and phosphorus and to cause said alloy to flow into the joint and bring about brazing of the metallic parts to be joined.

7. A method as claimed in claim 1 in which the ammonium phosphate is diammonium phosphate.

8. A method as claimed in claim 1 in which the ammonium phosphate is monoammonium phosphate.

9. A method as claimed in claim 5 in which the ammonium phosphate is diammonium phosphate.

10. A method as claimed in claim 5 in which the ammonium phosphate is monoammonium phosphate.

References Cited in the file of this patent

UNITED STATES PATENTS

| | | |
|---|---|---|
| 600,250 | Reese | Mar. 8, 1898 |
| 1,692,818 | Christoph | Nov. 27, 1928 |
| 2,200,742 | Hardy | May 14, 1940 |
| 2,609,598 | Mason | Sept. 9, 1952 |
| 2,633,631 | Horvitz | Apr. 7, 1953 |
| 2,714,760 | Boam et al. | Aug. 9, 1955 |

FOREIGN PATENTS

| | | |
|---|---|---|
| 309,032 | Great Britain | Oct. 24, 1929 |
| 487,263 | Great Britain | June 17, 1938 |